United States Patent [19]
Raedy

[11] Patent Number: 6,144,191
[45] Date of Patent: Nov. 7, 2000

[54] VOLTAGE REGULATOR

[75] Inventor: Steven Raedy, Schenectady, N.Y.

[73] Assignee: Utility Systems Technologies, Inc., Niskayuna, N.Y.

[21] Appl. No.: 09/507,400

[22] Filed: Feb. 18, 2000

[51] Int. Cl.$^7$ .................................................. G05F 3/02
[52] U.S. Cl. ........................................................... 323/207
[58] Field of Search .................................. 323/205, 207, 323/208

[56] References Cited

U.S. PATENT DOCUMENTS

| | | | |
|---|---|---|---|
| 3,968,422 | 7/1976 | Waldmann | 323/102 |
| 4,009,433 | 2/1977 | Moltgen | 323/102 |
| 4,306,283 | 12/1981 | Kiwaki et al. | 363/68 |
| 4,529,925 | 7/1985 | Tanaka et al. | 323/207 |
| 4,651,265 | 3/1987 | Stacey et al. | 363/35 |
| 4,878,208 | 10/1989 | Seki et al. | 307/87 |
| 5,166,597 | 11/1992 | Larsen et al. | 323/215 |
| 5,309,346 | 5/1994 | Gyugyi | 363/54 |
| 5,329,222 | 7/1994 | Gyugyi et al. | 323/207 |
| 5,343,139 | 8/1994 | Gyugyi et al. | 323/207 |
| 5,351,178 | 9/1994 | Brennen et al. | 363/40 |
| 5,351,180 | 9/1994 | Brennen et al. | 363/71 |
| 5,355,025 | 10/1994 | Moran et al. | 307/105 |
| 5,355,295 | 10/1994 | Brennen | 363/40 |
| 5,384,696 | 1/1995 | Moran et al. | 363/40 |
| 5,469,044 | 11/1995 | Gyugyi et al. | 323/207 |
| 5,610,501 | 3/1997 | Nelson et al. | 323/207 |
| 5,642,007 | 6/1997 | Gyugyi et al. | 307/102 |
| 5,646,511 | 7/1997 | Akamatsu et al. | 323/207 |
| 5,666,275 | 9/1997 | Inokuchi et al. | 363/35 |
| 5,808,452 | 9/1998 | Gyugyi et al. | 323/207 |
| 5,814,975 | 9/1998 | Nelson et al. | 323/207 |
| 6,014,017 | 1/2000 | Weinhold et al. | 323/207 |

*Primary Examiner*—Adolf Daneke Berhane
*Attorney, Agent, or Firm*—Heslin & Rothenberg, P.C.

[57] ABSTRACT

A voltage regulator is presented for regulating at least one of voltage, current or power to an electrical load. The regulator includes a transformer series connected between a power source and electrical load, and a bypass switch connected in parallel with the series connected transformer. The bypass switch is a back-to-back pair of silicon controlled rectifiers (SCRs). A pulse width modulated (PWM) inverter is coupled to the series connected transformer for generating a voltage to be applied to the series connected transformer. A controller is provided for transitioning the regulator from a normal mode through a commutate mode to an active mode, wherein the bypass switch is active in the normal mode and inactive in the active mode. The inverter provides a voltage to the series connected transformer in the active mode, and the controller and the PWM inverter together are configured to actively force the SCR off when the device is in the commutate mode.

4 Claims, 7 Drawing Sheets

VOLTAGE REGULATOR

TECHNICAL FIELD

The present invention relates in general to voltage regulation. More particularly, this invention relates to the use of silicon controlled rectifier (SCR) bypass switches in electric power system devices which employ a DC/AC inverter coupled to the power system through a series injection transformer.

BACKGROUND OF THE INVENTION

In recent years, quality requirements related to the delivery of electric power have increased dramatically. Modern automated manufacturing and process controls use complex machinery and data handling equipment which employ massive amounts of sophisticated circuits, e.g., solid-state electronic switching circuits and the like. Such circuits rely on substantially disturbance-free electric power which is provided by a utility distribution network. Due to their basic operation and internal structure, many modern electric circuits are sensitive to electrical disturbances and noise which may cause them to malfunction or even to fail, in turn interrupting or shutting down completely manufacturing and other processes. For example, it is well known that digital computers, and thus computer-controlled system loads, are critically sensitive to maintenance of a uniform utility signal. Consequently, interruptions or disturbances on the side of the distribution network which supplies power to these loads can cause significant waste in production time and material, and manufacturing, and substantial monetary losses in commercial operations.

Disturbances in electrical utility supply networks (transmission and distribution) might be caused for a variety of reasons. Power equipment faults and insulation failures, line switchings, capacitor switchings, large transformer and motor energizations, and non-linear loads such as arc furnaces, variable speed drives, rectifiers, etc. are only a few such causes. Such transient disturbances, as distinguished from complete power failure, manifest themselves as momentary power supply interruptions, voltage sags, voltage transients, voltage magnitude variations, and harmonics. Thus, voltage sags and transients may be caused by failures or switchings within a particular transmission or distribution line. Moreover, several lines in the transmission and distribution system may be tied to a single bus, such that these lines in parallel connection in effect feed a common bus. Because of this nature of power transmission and distribution networks, single line faults and switchings frequently do not result in power interruptions at the bus or in another line connected to that bus, but only in voltage sags and transients. The magnitude of such sags and transients is dependent upon the length and impedance characteristic of the lines involved in the overall network. Likewise, harmonic voltage components may be produced across the line impedance by harmonic load currents drawn by non-linear loads. These and other like disturbances are transient in nature, and are usually manifested by a change in peak-to-peak amplitude of the utility voltage and/or transient spikes and harmonics. Hereinafter, the term "disturbances" will refer to any of these conditions.

The field of this invention is that of providing a dynamic response to a power distribution line which carries power to a number of loads, at least some of which are sensitive to power line disturbances of the type described above. The field is similar to, but distinct from, that of the uninterruptible power supply (UPS) which is designed to interface between the utility-provided electric power line and critical equipment, such as a computer or data storage element. The UPS concept is to have a DC energy device, usually a battery, which is maintained in a charged state by connection to the power line, and to employ a DC to AC inverter to convert the DC battery power to the desired power. This is accomplished by generating a single-phase (or three-phase) alternating voltage which is identical to the normal utility voltage, i.e., has the same frequency and amplitude, and is in synchronism with it. There are two basic philosophies with regard to UPS devices. In one arrangement, the battery/inverter system normally provides the power for the critical load and the power line is used to keep the battery charged. A bypass switch is employed to get the utility power direct to the load only if the power/inverter system fails. This arrangement provides a substantially total isolation from the utility power system, and thus can provide a small amount of power that is essentially free of system disturbances. However, it has the disadvantage of requiring power conversion equipment that is operated normally at rated power and, accordingly, may introduce appreciable losses, particularly at higher power levels. Such an approach is not feasible for dynamic compensation of transient disturbances on a distribution line that is providing a significant amount of power to the loads attached to it.

In another UPS arrangement, the battery/inverter is connected essentially in parallel with the utility power system, but maintained normally in a stand-by state so that the power demand of the load is provided by the utility system via a fast circuit breaker (preferably solid-state) which can isolate the faulty utility system from the load and the battery/inverter power supply. With such a UPS, in the case of a power system disturbance or loss of power for a significant time, the circuit breaker is opened and the load is supplied directly from the battery/inverter system. When the power system is restored to its normal operation, the breaker is closed and the battery/inverter system goes back into standby, with power being supplied directly from the utility line. In this arrangement, the power conversion equipment is again fully rated, but the operating losses and cost are lower. The disadvantage of this arrangement is that it is difficult to make it responsive to fast dynamic transient conditions, or disturbances of relatively short duration, such that transients and harmonics can get to the load. Also, if a disturbance is recognized and reacted to quickly, then the battery must supply the entire load for the duration of the disturbance. While this is an adequate solution for relatively small power-consuming loads, it is not an appropriate solution for a utility distribution network which at any given moment may be providing a significant load. Consequently, the UPS philosophy is not acceptable to the utility environment which this invention addresses.

For voltage regulation of a utility line, the method of series (i.e., capacitive) line impedance compensation is known in the art. Thus, it is known that voltage variations in transmission and distribution systems may be caused by the voltage drop developing across the normally inductive series line impedance as a result of changing line (load) current. This variation in voltage available on the line can be reduced by partially canceling the line inductance, which is done by connecting a predetermined amount of capacitance in series with the line. The function of the series capacitor is effectively to inject a voltage into the line at the fundamental frequency so as to oppose the voltage drop developed across the inductive line impedance at the same frequency. This results in reducing the voltage drop to an equivalent to that of a shorter utility line with a smaller inductance.

Further, it is known that if an AC voltage, which has a quadrature phase relationship with the line current at the fundamental frequency (i.e., the voltage lags the current by 90 electrical degrees), the amplitude of which is made portional to that of the line current, is injected in series with the line, a series compensation functionally equivalent to that produced by a series capacitor is obtained. This technique, utilizing a solid-state inverter for injecting the compensating signal in series with the line, is disclosed in U.S. Pat. No. 5,198,746, issued Mar. 30, 1993. With this technique, the magnitude of the inverter output voltage which is inserted in series with the line can be varied continuously, and its polarity can be changed from that representative of a capacitor to that of an inductor, whereby the effective line impedance can be varied over a wide range. This technique is very efficient, and permits steady state maintenance of the line voltage at a substantially constant amplitude even in the face of large line current variations. It does not, however, meet the need for dynamic compensation of disturbances which require a real power input to the line in order to effectuate compensation. Thus, in the case of voltage sags, or transients which represent a dynamic change in real power which would otherwise be delivered to the load, there remains a need for an efficient and reliable mechanism for responding so as to minimize variations in the distribution line signal delivered to the loads that are tied to it.

DISCLOSURE OF THE INVENTION

Briefly summarized, the present invention comprises in one aspect a device for regulating at least one of voltage, current or power to an electrical load, the device including a transformer series connected between a power source and the electrical load, and a bypass switch connected in parallel with the series connected transformer. The bypass switch comprises a back-to-back connected pair of silicon controlled rectifiers (SCRs). A pulse width modulated (PWM) inverter is coupled to the series connected transformer for generating a voltage to be applied to the series connected transformer. The device further includes a controller for transitioning the regulator from a normal mode through a commutate mode to an active mode, wherein the bypass switch is active in the normal mode and inactive in the active mode. The inverter provides a voltage to the series connected transformer in the active mode and the controller and the PWM inverter comprise means for actively forcing the SCR off when the device is in the commutate mode.

To restate, in accordance with the principles of the present invention, an inverter coupled to the power system through a series injection transformer can be incorporated into a variety of devices which regulate voltage, power, and/or current in order to improve power quality, increase efficiency, or control processes. For example, an inverter-based voltage regulating device can provide precise regulation of voltage to industrial and commercial loads which are sensitive to variations in the supply voltage. Other applications include mitigation of harmonic voltages or currents, and active impedance control of electric power transmission lines. In all of these devices, the inverter section may be bypassed using electronic switches, such as silicon controlled rectifiers (SCRs). SCRs are advantageous over other electronic switches in the areas of cost, ruggedness, and overcurrent capability. However, SCRs are not fully controllable switches and do not cease to conduct current (i.e., turn off), once gated, until a natural current zero occurs. This is undesirable when SCRs are applied as bypass switches in a power electronic regulating device, because the device cannot transition out of bypass mode at any arbitrary instant. This invention describes a robust control method by which the DC/AC inverter may be used to force commutate the SCR off at an arbitrary instant when they are used as bypass switches. This allows a sub-cycle transition to be made from bypass to active mode without subjecting the components to damaging overcurrents. The approach described herein allows for load current continuity without the use of additional commutation components (i.e., capacitors or inductors). Sub-cycle commutation is not otherwise possible when using SCRs as bypass switches unless a separate commutation circuit is added, which adds cost and complexity to the circuit.

BRIEF DESCRIPTION OF THE DRAWINGS

The above-described objects, advantages and features of the present invention, as well as others, will be more readily understood from the following detailed description of certain preferred embodiments of the invention, when considered in conjunction with the accompanying drawings in which.

BEST MODE FOR CARRYING OUT THE INVENTION

Figure 1A:
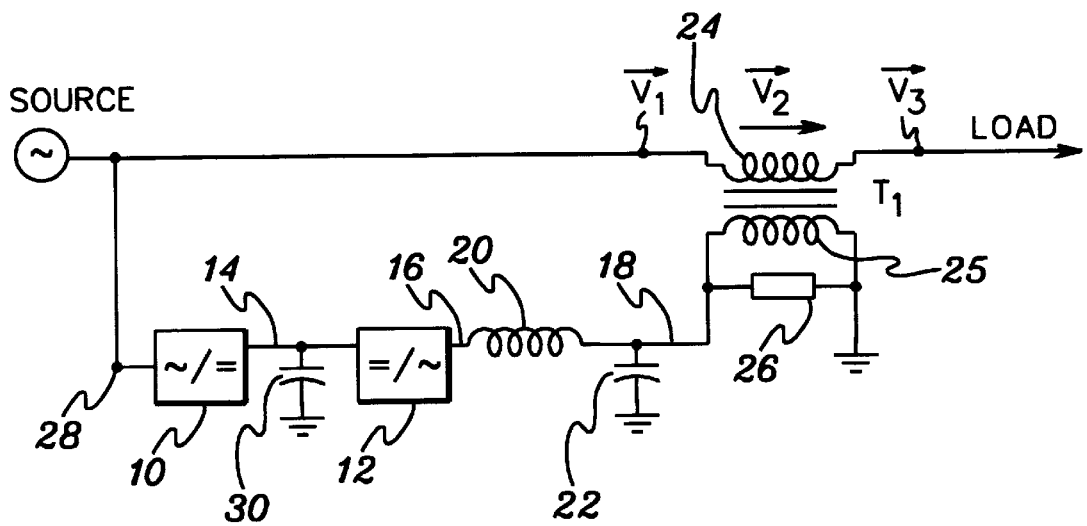
FIG. 1A is a simplified diagram of a network having active regulation of voltage (and other parameters) by inserting a synthesized voltage in series with an existing voltage by means of controlled static switches and a series transformer.

Prior art illustrates a means of providing active regulation of voltage and other parameters by inserting a synthesized voltage in series with the existing voltage by means of controlled static switches and a series transformer as shown in FIG. 1A. This system consists of a rectifier circuit 10, which converts the AC power system voltage at 28 to a DC bus voltage 14. Capacitor 30 is connected to the DC bus to reduce voltage ripple. Inverter circuit 12 converts the DC voltage into a controllable AC voltage 16 using pulse width modulation (PWM). PWM is a well known technique by which the duty cycle of the inverter switches are varied in order to synthesize a controllable voltage. PWM inverters produce an undesirable high frequency voltage component which must be filtered by an inductor-capacitor (L-C) filter (inductor 20 and capacitor 22). This LC filter presents a high impedance to the high frequency component of voltage 16 and a low impedance to the power system component of voltage 16, so that the voltage at 18 contains little high frequency distortion. This voltage is imposed upon the primary winding 25 of transformer T1. The resulting Voltage Q across the secondary winding 24 ($V_2$) is added in series with the source voltage $V_1$ to produce the output voltage $V_3$.

Figure 1B:
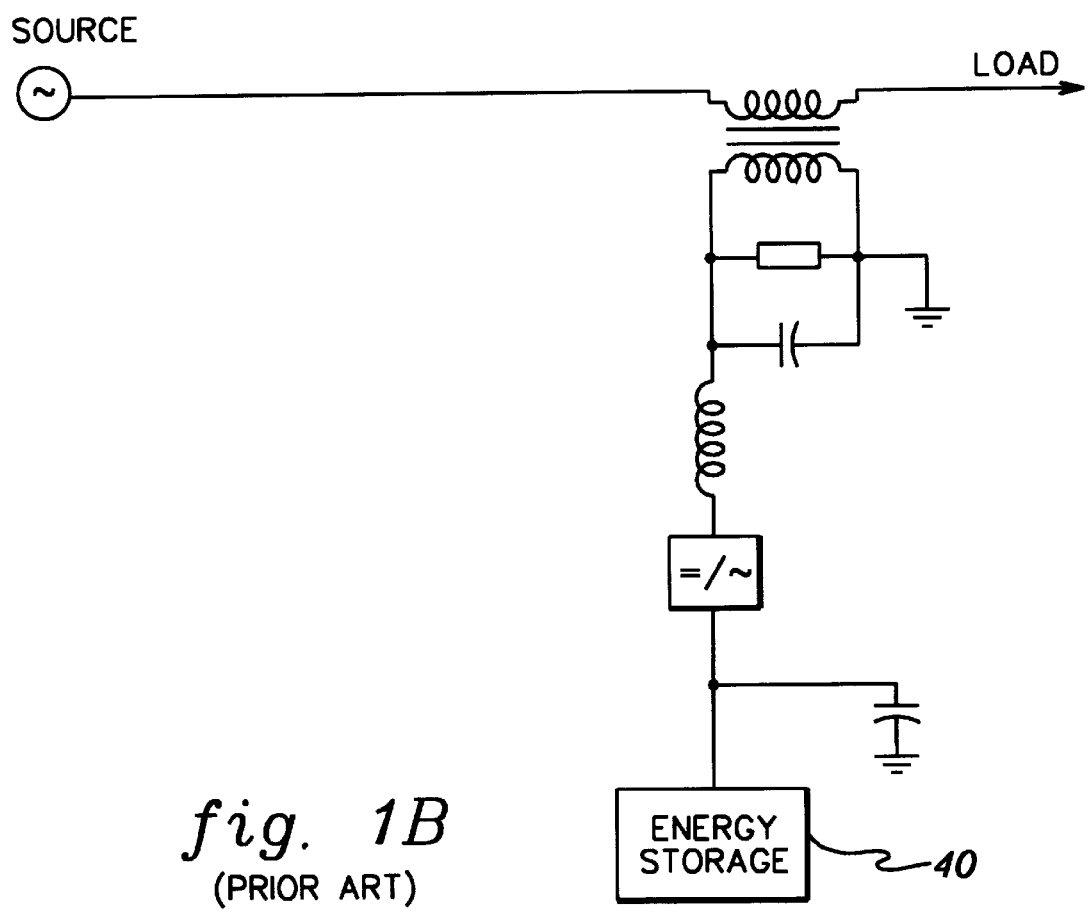
FIG. 1B is a schematic of an alternate embodiment of a network topology employing voltage regulation as depicted in FIG. 1A.

In addition to this topology, the topology of FIG. 1B may be employed to provide voltage regulation, which can be identical in all respects except that the DC bus 14 is charged by a source of stored energy, such as a battery or flywheel. (See U.S. Letters Pat. Nos. 4,651,265 and 5,329,222.)

A bypass switch 26 may be utilized in order to reduce the losses in the inverter section when it is not required to provide voltage support or other regulation. For example, the device may be designed to provide regulation only when the input voltage falls below a certain percentage of nominal. Under normal conditions, therefore, when the control circuitry determines that no regulation is needed, the losses in the device may be reduced by disengaging the inverter section and shorting the primary winding of the series injection transformer through the bypass switch. Under this condition the current required to maintain an ampere-turn balance between the two windings of the series injection transformer to permit the flow of load current is carried by the bypass switch. When there is a disturbance in the input voltage which is severe enough that correction is desired, the bypass switch must be opened and the inverter section activated to provide the required voltage compensation. The transfer of current from the bypass switch elements to the inverter switch elements should be accomplished in as short a time as possible after it is determined that a compensating voltage is required. In order to accomplish this commutation in sub-cycle time (i.e., less than one half electrical cycle), fully controllable switch elements may be utilized as the bypass switches, and may be turned on or off at any arbitrary instant. Transistors, Gate Turn Off Thyristors (GTOs), and IGBTs are examples of fully controllable switches which may be used for this purpose.

This invention resides in the control of the inverter section to force commutate Silicon Controlled Rectifiers (SCRs) to the off state when they are used as bypass switches in series transformer connected voltage regulation systems. By this means, the advantages of SCRs in the area of cost, efficiency, gate simplicity, and overcurrent capacity are realized while retaining the functional advantages of fully controllable switches.

Figure 2:
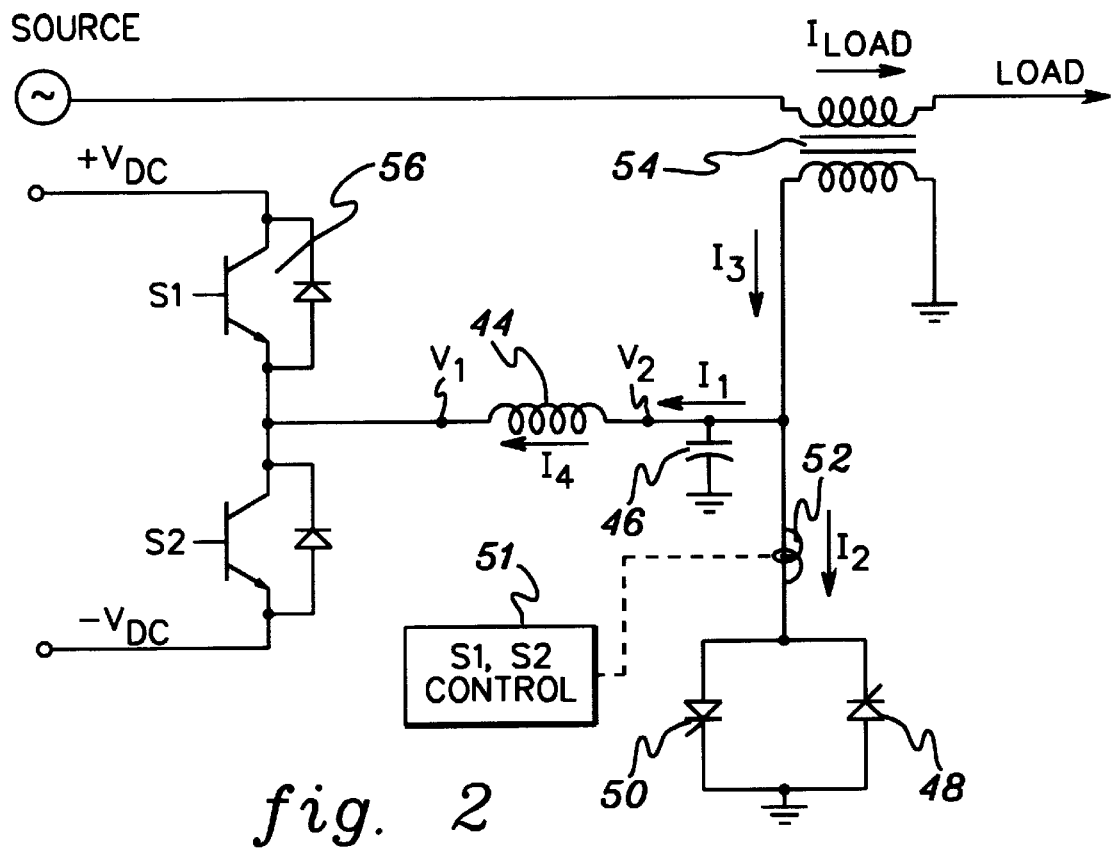
FIG. 2 is a schematic of one embodiment of a single phase voltage regulator with bypass switching in accordance with the principles of the present invention.
Figure 3:
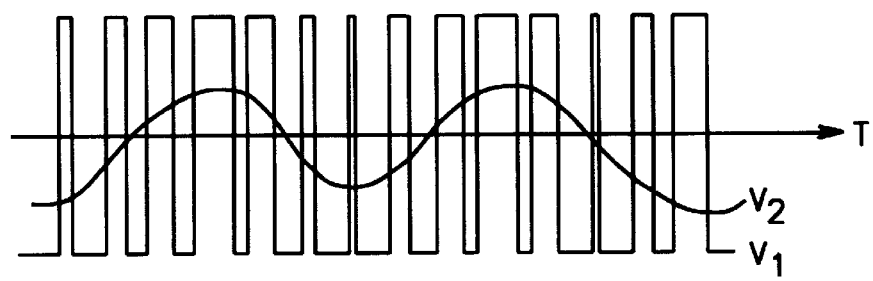
FIG. 3 is exemplary of voltages that might be obtained at the output ($V_1$) of the inverter circuit and the high frequency filter ($V_2$) of FIG. 2.

A single phase circuit is shown in FIG. 2 and is used to describe the fundamental concepts of the present invention. This circuit utilizes a PWM inverter comprising static switches S1 and S2, which are pulse width modulated to synthesize a desired voltage $V_1$ as shown in FIG. 3. Pulse width modulation is a well known technique of synthesizing a pulse train approximation of a desired voltage by varying the relative time periods during which switches S1 and S2 are gated. When S1 is gated, the voltage across S1 is nearly zero, so that $V_1=+Vdc$. When S2 is gated, the voltage across S2 is nearly zero, so that $V_1=-Vdc$ (S1 and S2 are not gated simultaneously). Voltage $V_1$ in FIG. 3 shows a voltage that may typically be synthesized in this manner. The high frequency component of $V_1$ is filtered by an LC filter comprising inductor 44 and capacitor 46 to produce the AC voltage $V_2$. By this control method, the DC voltage is converted to an AC voltage, so that switches S1 and S2, appropriately controlled, in conjunction with a high frequency filter, constitute a DC/AC inverter. The AC voltage $V_2$ is impressed across a primary winding of a series injection transformer 48. This voltage is reflected on the secondary winding and is added to the source voltage to produce the desired output voltage.

In one embodiment, a bypass switch includes SCRs 48 and 50, connected in a reverse parallel arrangement as shown. The bypass SCR pair may be utilized to carry the load current $I_1$ when the inverter section is disengaged. When gate current is supplied to the SCRs, with inverter switches S1 and S2 off, SCRs 48 and 50 carry current during alternate half cycles of the load current $I_3$. Because conducting SCRs produce a very small forward voltage drop, on the order of 1 Volt, the voltage $V_2$ can be considered to be zero relative to a power system voltage of at least 100 volts, and no compensating voltage is provided. In bypass mode, therefore, the series transformer 48 has no voltage across its windings. However, both windings must still carry load current, so that $I_3=(I_{load}\times\text{transformer turns ratio})$, $I_4=I_1=0$, and $I_2=I_3$, so that the ampere turn balance in the series transformer, which is required for load current to flow, is maintained completely by the bypass SCRs. For example, if the series transformer turns ratio is 1:1, then $I_{load}=I_2=I_3$.

This configuration also includes a commutation control circuit which receives as its input the polarity of the current through the bypass SCR pair via current transformer 50. This control circuit, when active, controls the state of inverter switches S1 and S2.

When a condition arises such that it is desired to engage the inverter section and disengage the bypass switch, the control circuitry initiates the following sequence of events:
1) The gating signal to the bypass SCRs is removed. Current through the SCR that is conducting at the time continues to flow, however, because SCRs cease to conduct only when the circuit forces the current to zero.
2) Beginning at the instant that the SCR gating signals are removed, inverter switches S1, and S2 are controlled in the following manner, if:
   $I_1$ is positive:
     S2 is turned on, if $I_2$ has been positive for the previous tq time interval,
   $I_1$ is negative:
     S1 is turned on, if $I_2$ has been negative for the previous tq time interval.

Using this control scheme, the current which is flowing through the conducting SCR at the time of initiation will be commutated to the inverter as shown in FIG. 2. The rate at which the current is comminutated is determined by the values of Vdc and the filter inductor L, by the relationship $$di/dt=V_{DC}/L$$

From this relationship the maximum time period during which switches S1, and S2 must be controlled in this manner in order to ensure total commutation is determined as $$t_{max}=I_{3max}*L/Vdc+tq$$

wherein:

$t_{max}$=maximum commutation time $I_{3max}$=the maximum instantaneous value which $I_3$ can assume in Amperes L=the inductance of the filter inductor in Henries Vdc=DC voltage tq=turn off time of SCRs in seconds Where $t_{max}$, using typical values of L, Vdc, $I_{3max}$, and tq, will be much shorter than one half of a 60 HZ electrical cycle, so that sub-cycle commutation times are easily achieved. For example, for a maximum load current of 200 Amperes (RMS), a series transformer ratio of 1:1 (so that $I_3=I_{load}$), and an input voltage of 277 VAC, Vdc=391

L=0.0005 H tq=0.0001 S $I_{3max}$=200*√√2=283 A

Following the commutation period, the control of inverter switches S1, and S2 is transferred to the main control module 51 and controlled to provide the necessary power regulation.

The delay time tq is introduced into the scheme because of the nature of SCR switches, which, following conduction of current, cannot support a forward voltage until a brief time following current zero, designated tq typically 150 microseconds or less for devices rated 1200V). This control method, therefore, maintains a reverse voltage bias upon the SCRs for this period of time to ensure that the SCRs can support a full forward voltage at the end of the commutation period.

Figure 4A:
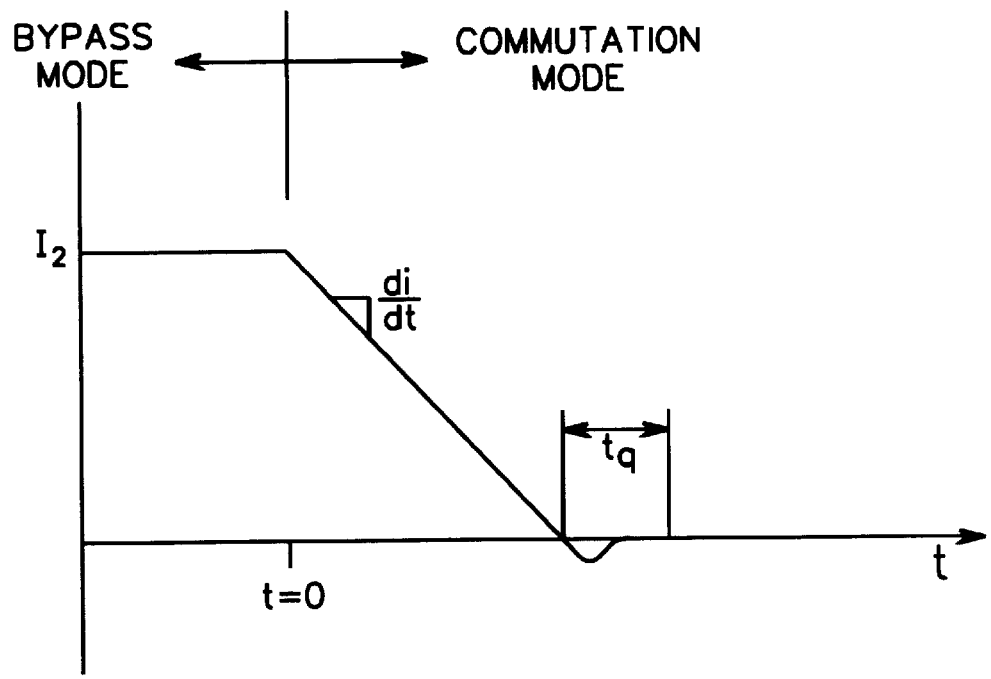
FIGS. 4A & 4B are graphs of the bypass switch current $I_2$ and inverter circuit voltage $V_1$, respectively, of the circuit of FIG. 2 showing how the bypass switch current responds to changes in the inverter circuit output voltage in accordance with the principles of the present invention.
Figure 4B:
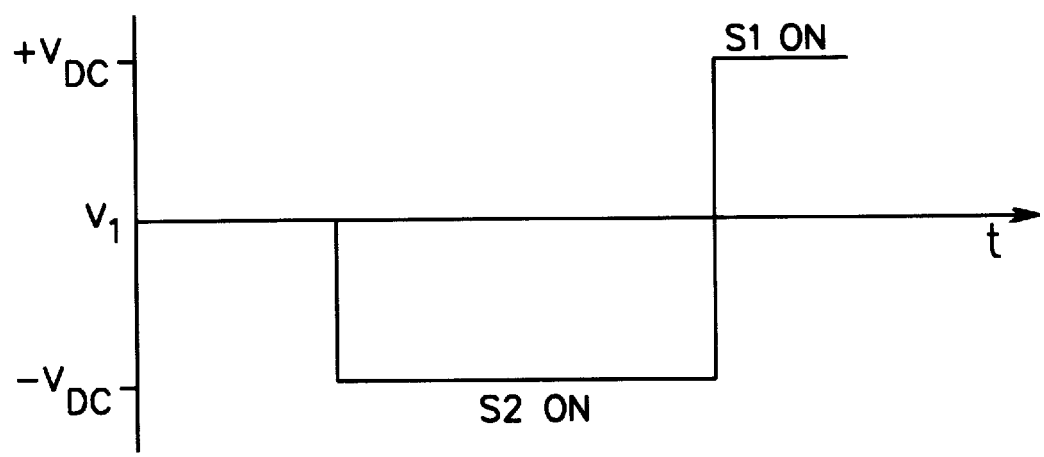

In the example of FIGS. 4A & 4B, during t<0, the series transformer is bypassed, and SCR 50 is conducting. At time t=0, switches S1 and S2 are gated per the commutation scheme described. Because $I_2$ has been positive for the past tq time interval, switch S2 is gated. With S1 on, $V_1$=+Vdc and $V_3$=0, so that the voltage across filter inductor L is +Vdc. By the general relationship V=L *(di/dt), the current through the conducting SCR 50 decreases at the rate of V/L. At time $t_1$+tq, the current through SCR 50 has been commutated completely to the inverter. When the switches are gated per the commutation scheme described, the current through the conducting SCR will always be forced to zero for a period which is sufficient to turn the switch off.

Figure 5:
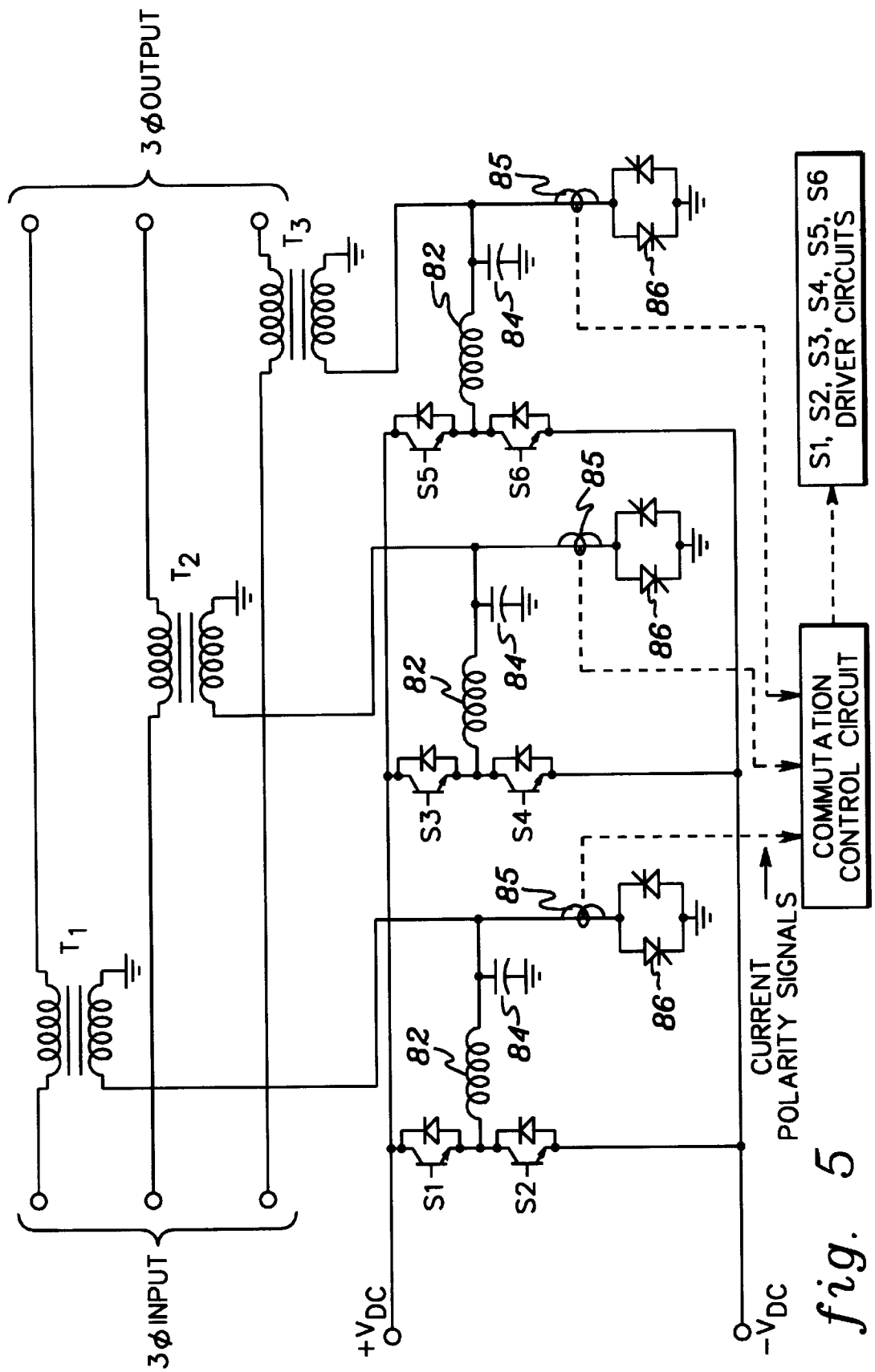
FIG. 5 is a schematic of one embodiment of a three phase Y connected voltage regulator employing three bypass switches in accordance with the principles of the present invention.

The concepts of the present invention are applicable to three phase, four wire systems as shown in FIG. 5. This arrangement shows a typical three phase inverter consisting of switches S1 through S6 which are fed from a common DC bus, and three high frequency L-C filters, comprising inductors 82 and capacitors 84. Each phase of the three phase arrangement contains a bypass SCR pair 86, and current transformers 85 to detect the bypass SCR current polarities to be used by the commutation control circuitry. In this system each phase may be controlled independently of the other two phases so that the control scheme for each phase is similar to the control of a single phase system as previously described.

Figure 6:
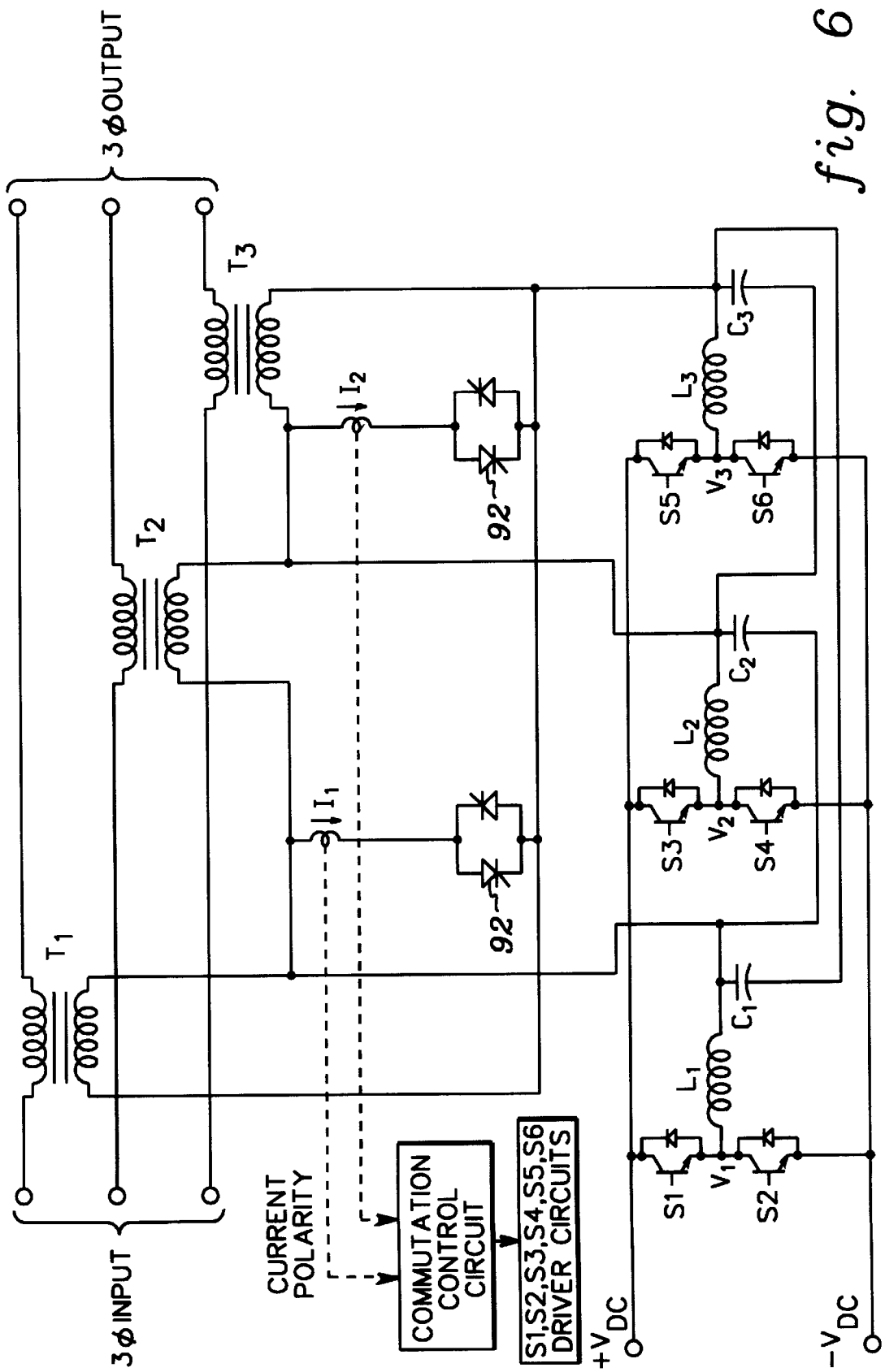
FIG. 6 is a schematic of one embodiment of a three phase delta connected voltage regulator employing two bypass switches in accordance with the principles of the present invention.

A variation of this scheme applicable to a 3 phase 3 wire system, in which the primaries of the series transformers are delta connected, is shown in FIG. 6. In 3 phase, 3 wire systems, only 2 bypass SCR pairs 92 are required to carry the three phase load current through the series transformers, so that when the bypass SCR pairs are gated, the ampere turn balance required by series transformers $t_1$, $t_2$, and $t_3$ is maintained by currents $I_1$ and $I_2$.

When a condition arises such that it is desired to engage the inverter section and disengage the bypass switch, the following sequence of events is initiated by the control circuitry:

1) The gating signals to the SCRs are removed.
2) Switches S1 and S2 are controlled in the following manner, if:
   $I_1$ is positive:
     S2 is turned on, if $I_1$ has been positive for the previous tq time interval,
   $I_1$ is negative:
     S1 is turned on, if $I_1$ has been negative for the previous tq time interval,
3) Switches S3 and S4 are controlled in the following manner:
   $I_2$ is positive:
     S4 is turned on, if $I_2$ has been positive for the previous tq time interval,
   $I_2$ is negative:
     S3 is turned on, if $I_2$ has been negative for the previous tq second time interval,
4) Switches S5 and S6 are switched alternately on and off at a switching frequency (fsw), so that, for each successive time period (1/fsw) during the commutation period, switch S5 is on and switch S6 is off for the first half of the time period, and switch S5 is off and switch S6 is on for the second half of the time period. This results in the voltage $V_3$ as shown in FIG. 7E.

In this fashion, current $I_1$ and $I_2$ will be commutated at the following rates for as long as both $I_1$ and $I_2$ are nonzero (assuming constant load current, and assuming $L_1=L_2=L_3=L$):

$$dI_1/dt=(V_1-V_2)/(2L)+(V_1-V_3)/(2L) \quad (1)$$

$$dI_2/dt=(V_2-V_1)/(2L)+(V_2-V_3)/(2L) \quad (2)$$

In these equations, the values of the expressions ($V_1-V_2$), ($V_2-V_1$), ($V_1-V_3$), and ($V_2-V_3$) each assume either the value +Vdc or −Vdc, depending on the state of switches S1 through S6.

It is necessary to alternately switch S5 and S6 on and off in order to account for circumstances in which currents $I_1$ and $I_2$ are the same polarity at the time commutation begins. In such a case, the first term in equations (1) and (2) will be zero, and the second term will alternate between zero (i.e., no change in current) and +Vdc/2L or −Vdc/2L as required to force the current towards zero.

Figure 7A:
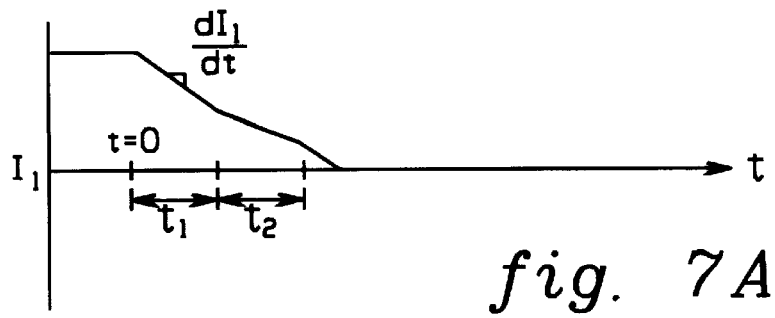
FIGS. 7A–7E depict bypass current $I_1$, bypass current $I_2$, and inverter output voltages $V_1$, $V_2$ & $V_3$, respectively, showing how the bypass switch currents $I_1$ & $I_2$ respond to changes in the inverter voltages $V_1$, $V_2$ & $V_3$ for the three phase delta voltage regulator of FIG. 6 in accordance with the principles of the present invention.
Figure 7B:
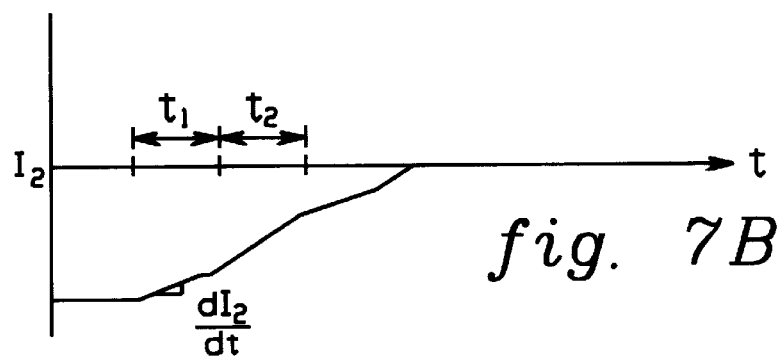
Figure 7C:
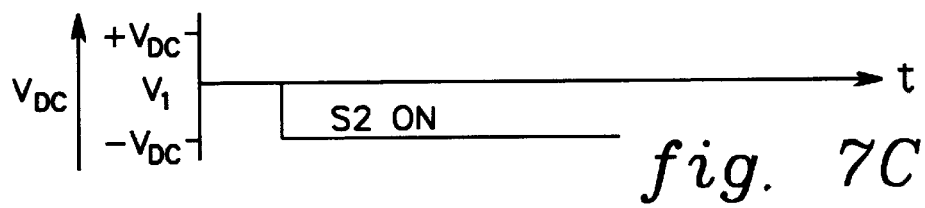
Figure 7D:
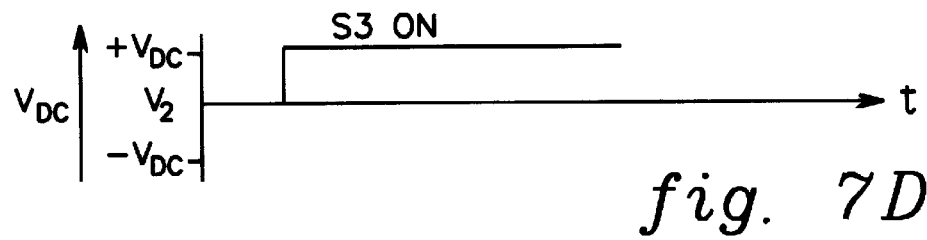
Figure 7E:
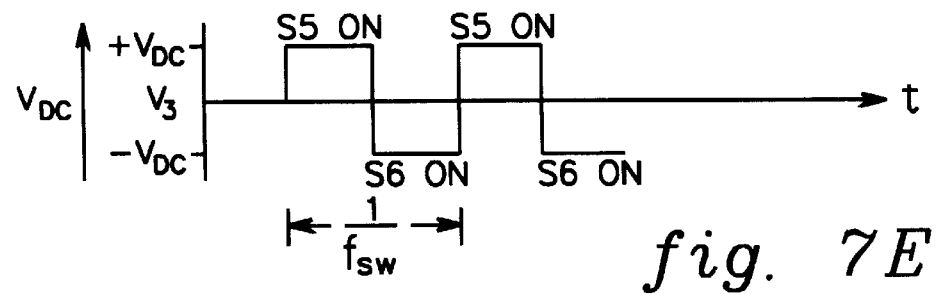

FIGS. 7A through 7E illustrate a typical commutation of $I_1$ and $I_2$. At time t=0, commutation begins, and S2 and S3 are switched on in response to the polarity of $I_1$ and $I_2$, resulting in the values of $V_1$ and $V_2$ as shown in FIGS. 7C and 7D. Switches S5 and S6 are switched alternately on and off at a switching frequency fsw, resulting in the Voltage $V_3$ as shown in FIG. 7E. In response to these forcing voltages, during the first time interval $t_1$ after commutation begins, currents $I_1$ and $I_2$ are forced towards zero at the rates:

$$dI_1/dt=(V_1-V_2)/(2L)+(V_1-V_3)/(2L)=-Vdc/L$$

$$dI_2/dt=(V_2-V_1)/(2L)+(V_2-V_3)/(2L)=+Vdc/2L$$

During the next time interval $t_2$, switches S5 and S6 change state (i.e., $V_3$ changes from positive to negative), resulting in the new rates of commutation:

$$dI_1/dt=-Vdc/2L$$

$$dI_2/dt=+Vdc/L$$

Figure 8:
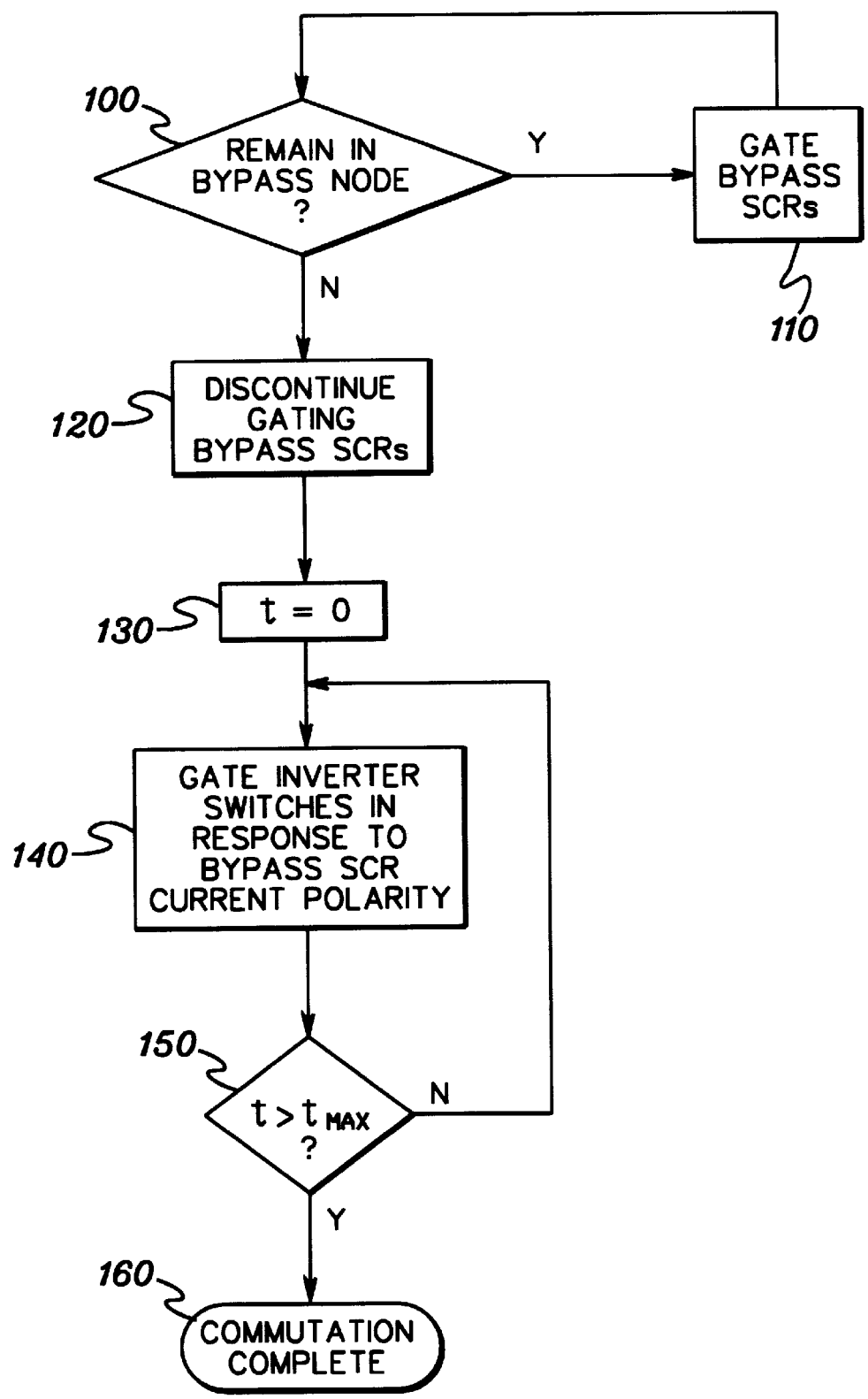
FIG. 8 is a flowchart of one embodiment of single or three phase voltage regulation in accordance with the principles of the present invention.

Following the commutation period, the duty cycle of the inverter switches (switches S1 ... S6) are then controlled as required to provide the desired regulation. FIG. 8 depicts one embodiment of voltage control processing for a single phase or a three phase implementation in accordance with the principles of the present invention. Processing inquires whether the bypass switch is to be maintained in bypass mode 100. If so, the bypass SCRs are gated to maintain the bypass mode 110. If bypass mode is to be exited, processing discontinues gating of the bypass SCRs 120 and sets a clock time equal to zero 130. The inverter switches are then gated in response to the bypass SCR current polarity as described above. This gating of the inverter switches continues until the clock time t is greater than a certain predefined maximum time interval $t_{max}$ 150. Once the gating of inverter switches has passed preset time interval $t_{max}$, the commutation is complete 160.

While the invention has been described in detail herein in accordance with certain preferred embodiments thereof, many modifications and changes therein may be effected by those skilled in the art. For example, because the polarity of the voltage drop across a back-to-back SCR pair is the same as the current polarity, all of the schemes described herein could be implemented using voltage sensing devices in place of the current polarity sensing devices discussed above. This would result in identical implementations of the commutation schemes; however, in these alternate embodiments a voltage signal is used to determine the polarity of the bypass SCR current. Accordingly, it is intended by the appended claims to cover all such modifications and changes as fall within the true spirit and scope of the invention.

What is claimed is:

1. A regulator for regulating at least one of voltage, current or power to an electrical load, said regulator comprising:

a transformer series connected between a power source and said electrical load;

a bypass switch connected in parallel with said series connected transformer, said bypass switch comprising a back-to-back pair of silicon controlled rectifiers (SCRs);

a pulse width modulated (PWM) inverter coupled to said series connected transformer for generating a voltage to be applied to said series connected transformer; and a controller for transitioning said regulator from a normal mode through a commutate mode to an active mode, wherein said bypass switch is active in said normal mode and inactive in said active mode, said inverter providing a voltage to said series connected transformer in said active mode, and wherein said controller and said PWM inverter comprise means for actively forcing said SCR off when said device is in said commutate mode.

2. The regulator of claim 1, wherein said means for actively forcing said SCR off when said device is in said commutate mode comprises means for gating said PWM inverter in response to a current polarity of said bypass switch at the time said controller transitions said regulator from said normal mode through said commutate mode.

3. The regulator of claim 2, wherein said PWM inverter comprises a first switch S1 and a second switch S2 coupled in series between a positive supply voltage $V_{dc}$ and a negative supply voltage $-V_{dc}$, and wherein said means for actively forcing said SCR off when said device is in said commutate mode comprises means for gating switches S1 & S2 to drive SCR current to zero when said device is in said commutate mode.

4. The regulator of claim 3, wherein said means for gating switches S1 & S2 comprises means for turning switch S2 on if current through said bypass switch is positive for a previous tq time interval, and for gating switch S1 on if current through said bypass switch has been negative for the previous tq time interval, wherein time interval tq comprises a turn off time of said bypass switch.

* * * * *